(12) United States Patent
Arnone et al.

(10) Patent No.: US 10,210,504 B1
(45) Date of Patent: *Feb. 19, 2019

(54) SYSTEMS AND METHODS FOR GIFT CARD LINKING

(71) Applicant: JPMorgan Chase Bank, N.A., New York, NY (US)

(72) Inventors: Joseph P. Arnone, Swedesboro, NJ (US); Quoc Nguyen, Pennsauken, NJ (US); Heather Spinnenweber, Berwyn, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,187

(22) Filed: Mar. 7, 2017

Related U.S. Application Data

(63) Continuation of application No. 14/136,376, filed on Dec. 20, 2013, now Pat. No. 9,639,894.

(60) Provisional application No. 61/914,166, filed on Dec. 10, 2013, provisional application No. 61/903,135, filed on Nov. 12, 2013.

(51) Int. Cl.
*G06Q 20/34* (2012.01)

(52) U.S. Cl.
CPC .................................. *G06Q 20/34* (2013.01)

(58) Field of Classification Search
None
See application file for complete search history.

(56) References Cited

U.S. PATENT DOCUMENTS

| | | |
|---|---|---|
| 2010/0293065 A1 | 11/2010 | Brody et al. |
| 2011/0047045 A1 | 2/2011 | Brody et al. |
| 2012/0136780 A1 | 5/2012 | El-Awady et al. |
| 2012/0239417 A1 | 9/2012 | Pourfallah et al. |
| 2012/0253852 A1 | 10/2012 | Pourfallah et al. |
| 2014/0379361 A1 | 12/2014 | Mahadkar et al. |
| 2015/0019424 A1 | 1/2015 | Pourfallah et al. |

*Primary Examiner* — Fateh M Obaid
(74) *Attorney, Agent, or Firm* — Hunton Andrews Kurth LLP

(57) ABSTRACT

Systems and methods for gift card linking are disclosed. According to one embodiment, a method for processing a payment using a linked stored value instrument may include (1) receiving, from a merchant, a payment request for a transaction, the payment request comprising an identification of a transaction amount and a transaction account; (2) at least one computer processor retrieving a stored value instrument for the merchant that is associated with the transaction account; and (3) the at least one computer processor causing the stored value instrument to be debited for a first portion of the transaction amount.

11 Claims, 7 Drawing Sheets

SYSTEMS AND METHODS FOR GIFT CARD LINKING

RELATED APPLICATIONS

This application is a Continuation of U.S. patent application Ser. No. 14/136,376, filed Dec. 20, 2013, which claims the benefit of U.S. Provisional Patent Application Ser. No. 61/903,135 filed Nov. 12, 2013 and U.S. Provisional Patent Application Ser. No. 61/914,166, filed Dec. 10, 2013. The disclosure of each of these documents is incorporated, by reference, in its entirety.

BACKGROUND OF THE INVENTION

1. Field of the Invention

The present invention generally relates to gift cards, and, more particularly, to systems and methods for gift card linking.

2. Description of the Related Art

Gift cards are very popular, and are often among the most requested type of gift. Gift cards provide advantages for everyone involved in the gift-giving process. For example, the gift card giver does not have to spend time determining the gift that the gift receiver wants, needs, or has, but can instead give a gift card to one of the gift receiver's preferred merchants. The gift card receiver can select what he or she wants, and does not have to worry about returns or exchanges. The merchants often see an increase in sales, as the gift card receivers often spend more than the amount of the gift card.

SUMMARY OF THE INVENTION

Systems and methods for gift card linking are disclosed. In one embodiment, a method for linking a stored value instrument to at least one transaction account may include (1) receiving an identifier for a stored value instrument; (2) receiving an identifier for a transaction account; (3) at least one computer processor associating the stored value instrument with the transaction account identifier; and (4) storing the association in at least one database.

The method may further include receiving at least one preference associated with the use of the stored value instrument.

In one embodiment, the stored value instrument may be a gift card, a gift certificate, etc. In one embodiment, the stored value instrument may be associated with a merchant.

In one embodiment, the transaction account may be a credit card account, a checking account, etc.

In one embodiment, identifiers for a plurality of transaction account may be received, and the at least one computer processor may associate the stored value instrument with the plurality of transaction account identifiers.

In another embodiment, a method for processing a payment using a linked stored value instrument may include (1) receiving, from a merchant, a payment request for a transaction, the payment request comprising an identification of a transaction amount and a transaction account; (2) at least one computer processor retrieving a stored value instrument for the merchant that is associated with the transaction account; and (3) the at least one computer processor causing the stored value instrument to be debited for a first portion of the transaction amount.

The method may further include the at least one computer processor requesting an available balance for the stored value instrument before causing the stored value instrument to be debited.

In one embodiment, the first portion of the transaction amount may be the available balance for the stored value instrument.

In another embodiment, the first portion of the transaction amount may be less than the transaction amount, and the method may further include the at least one computer processor charging a difference between the transaction amount and the first portion of the transaction amount to the transaction account.

In one embodiment, the method may further include the at least one computer processor retrieving a second stored value instrument for the merchant that is associated with the transaction account; and the at least one computer processor causing the second stored value instrument for a second portion of the transaction amount to be debited.

In one embodiment, the stored value instrument may be a gift card, a gift certificate, etc. In one embodiment, the stored value instrument may be associated with a merchant.

In one embodiment, the transaction account may be a credit card account, a checking account, etc.

According to another embodiment, a method for processing a payment using a linked gift card may include (1) receiving, at a merchant and from a customer, a transaction account identifier and a transaction to be conducted; (2) receiving, at the transaction account issuer and from the merchant, a payment request for a transaction, the payment request comprising an identification of a transaction amount and the transaction account identifier; (3) at least one computer processor at the transaction account issuer retrieving a stored value instrument for the merchant that is associated with the transaction account; (4) the at least one computer processor requesting an available balance for the stored value instrument from the merchant; (5) the at least one computer processor causing the stored value instrument to be debited for a first portion of the transaction amount; and (6) the at least one computer processor causing the transaction account to be charged for any difference between the transaction amount and the first portion of the transaction amount.

In one embodiment, the method may further include the at least one computer processor causing the available balance to be provided to the customer; and the at least one computer processor receiving approval to use the stored value instrument to pay for the first portion of the transaction amount.

In one embodiment, the merchant may receive the transaction account identifier at a point of sale device. In another embodiment, the merchant may receive the transaction account identifier through a website.

In one embodiment, the stored value instrument may be a gift card, a gift certificate, etc. In one embodiment, the stored value instrument may be associated with a merchant.

In one embodiment, the transaction account may be a credit card account, a checking account, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
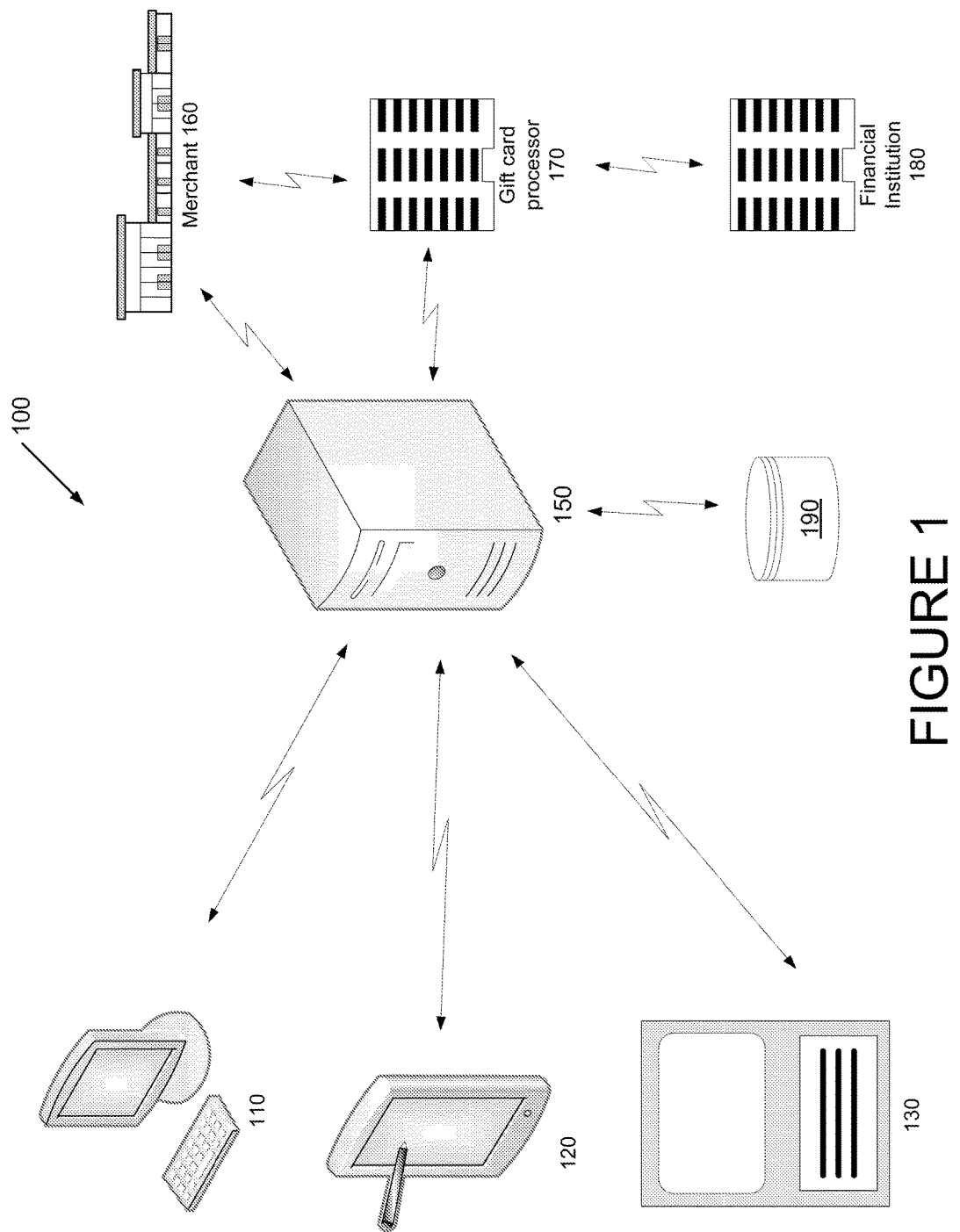
FIG. 1 is a block diagram of a system for gift card linking according to one embodiment.

Several embodiments of the present invention and their advantages may be understood by referring to FIGS. 1-7, wherein like reference numerals refer to like elements.

Systems and methods for a gift card linking are disclosed. In general, "gift card linking" describes a process of linking one or more merchant gift cards to a financial account, such as a credit card account, a debit card account, a checking account, etc. These linked gift cards can be used at the time of purchase, either in person (e.g., at a point of sale device, ATM, etc.) or on-line, to reduce the amount of money a customer will borrow from a credit card. In one embodiment, the process of linking the gift card to the financial account does not invalidate or "zero balance" the original gift card, and the linked gift card may still be used separately. In another embodiment, once linked, the physical gift card may be prevented from being used in a non-linked fashion.

In one embodiment, once the gift card is registered, the customer and/or the merchant may decide whether to use the gift card funds for all or part of the transaction.

In one embodiment, after it is linked, the customer will not need to have the linked gift card present to conduct the transaction.

In one embodiment, a gift card may be linked to more than one account. For example, if the user has more than one account with financial institution X, the user may select to link the gift card to all accounts, or to a subset of those accounts.

In another embodiment, a gift card may be linked to an account alias, such as a phone number, a device identifier, a token identifier, a serial number, an email address, a biometric, etc.

In one embodiment, the user may be notified of gift card balances for merchants in the user's vicinity. For example, as a user approaches a merchant with whom the user has a linked gift card, system may notify the user that he or she is near the merchant, and the gift card balance that the user has with the merchant. In one embodiment, the user may also be provided with marketing information for the user (e.g., offers, sales, specials, discounts, etc.). In one embodiment, the user may customize the notifications (e.g., the frequency, balance thresholds, merchants, etc.) as necessary and/or desired.

In one embodiment, the merchant may identify the location of the user. In another embodiment, the device may identify merchants with which the user has registered gift cards that are in his or her vicinity.

In one embodiment, a computer application may be provided for managing gift cards and linking the gift cards to the desired account(s). The application may be a mobile application, a computer program, a web application, a website, etc. In one embodiment, a user may add or delete a gift card using the application, and the application may retrieve the gift card balance and provide it to the user. In one embodiment, the user may add the gift card by entering the gift card number, scanning a machine readable code, taking an image of the gift card, etc. In one embodiment, for security, the user may need to enter a gift card security code as well.

In one embodiment, a user may also reload a gift card using, for example, the financial account to which the gift card is linked. In one embodiment, the gift card may be reloaded periodically (e.g., $10 added every month), on the occurrence of an event (e.g., the balance falls below a certain amount), etc.

In one embodiment, the gift card data may be stored with the credit card issuer, not with the application. Thus, this provides an additional level of security against the loss or theft of a physical gift card. In one embodiment, once registered, the physical gift card may be prevented from being used in a non-linked manner.

In one embodiment, the application may provide the user with a gift card marketplace. For example, the user may buy gift cards from merchants, and may have those gift cards electronically added and/or linked to the desired account(s).

In one embodiment, the user may also use the gift card marketplace to buy, sell, or trade gift cards with third parties, such as individuals. For example, if a user does not want a gift card for Merchant A, he or she may offer to sell it for a certain amount.

In one embodiment, the total gift card value for more than one gift card may be more easily accessed and used. For example, two $25 gift cards for the same merchant may be combined for a $50 credit.

Although the term "gift card" is used throughout this disclosure, it should be recognized that this encompasses all stored value instruments, including merchant gift cards, network gift cards, gift certificates, e-gift cards, etc.

Referring to FIG. 1, an exemplary system for gift card linking is provided. System 100 may include computer 110, which may be a desktop computer, laptop computer, notebook computer, tablet computer, etc.; mobile device 120, which may be a smart phone, e-reading device, etc., kiosk 130; server 150; merchant 160; merchant gift card processor 170; financial institution 180; and database 190.

In one embodiment, any or all of computer 110, mobile device 120, kiosk 130, server 150, merchant 160, merchant gift card processor 170, financial institution 180, and database 190 may communicate using any suitable communication method or network, including the Internet, intranets, virtual private networks, cellular networks, virtual private networks, plain old telephone systems, wireless networks, etc. In addition, some or all of merchant 160, merchant gift card processor 170, and financial institution 180 may communicate directly.

In one embodiment, a customer may register his or her gift cards using any of computer 110, mobile device 120, kiosk or ATM 130, by telephone, etc. The customer may specify one or more account that the customer has with financial institution 180 to which the gift card is to be linked.

The customer may initiate a purchase with merchant 160 in person at merchant 160, at kiosk 130, or on-line using computer 110 or mobile device 120. The customer may present a linked account for payment. During the authorization process, server 150, which may be part of financial institution 180's payment authorization system, may check to see if the customer has any linked gift cards with merchant 160.

In one embodiment, if there is a linked gift card, financial institution 180 or server 150 may check with merchant 160 and/or gift card processor 170 for the balance of the gift card. Based on the gift card balance, financial institution 180 may deduct the gift card balance from the transaction.

In one embodiment, financial institution 180 may present messages to the customer, such as gift card balance, requests to confirm the use of the gift card, any promotions involving the presented account that would be missed by using the gift card, etc. via a point of sale station at merchant 160, on computer 110, mobile device 120 or on kiosk 120. In one embodiment, the messages may be provided via a separate communication channel (e.g., by SMS, email, etc.) to a registered device.

In one embodiment, server 150 may monitor a location of mobile device 120 in order to determine if mobile device 120 is near merchant 160. In one embodiment, mobile device 120 may periodically be requested to provide server 150 with GPS location data. In another embodiment, merchant 160 may detect the presence of mobile device 120 when it is in the vicinity of merchant 160 for proximity marketing. In one embodiment, NFC, Bluetooth Low Energy (LBE), Bluetooth, or similar technology may be used to detect the presence of mobile device 120.

In another embodiment, mobile device 120 and/or an application executed by mobile device 120 may monitor its location and alert the user when it is in the vicinity of any merchants with registered gift cards.

Figure 2:
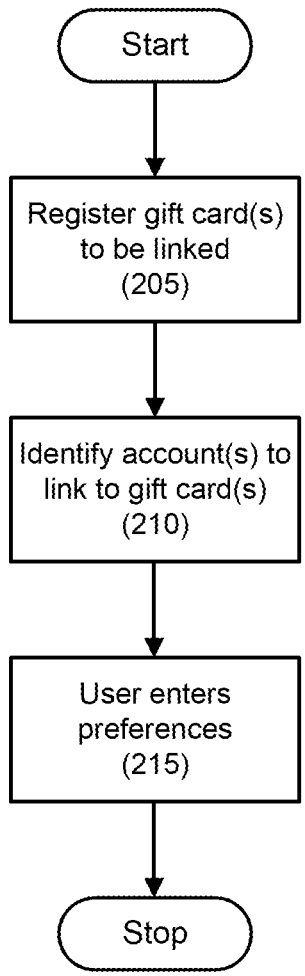
FIG. 2 depicts an method for gift card linking according to one embodiment.

Referring to FIG. 2, an exemplary process flow for gift card linking according to one embodiment is provided. In step 205, user may register gift card that he or she wishes to be linked to at least one account. In one embodiment, the user may capture an image of the gift card (e.g., a photo of the card including card number or other identifying information), scan a machine readable code on the gift card, swipe (or dip) the magnetic stripe of the gift card, wirelessly capture the gift card information from a RF-enabled gift card (e.g., "tap" the gift card to a reading device), enter the card number, etc. Any suitable method for identifying the gift card may be used as necessary and/or desired.

In one embodiment, the user may enter gift card information on a mobile application executed by a mobile device, on a website, at a branch, at a kiosk, at an ATM, etc. Any suitable mechanism for receiving the gift card identification may be used as necessary and/or desired.

In one embodiment, the user may register a gift card at a point of sale (POS) device. For example, the user may swipe a gift card and be given an option to link the gift card to his or her account(s) for the current transaction or a future transaction.

The information for any suitable gift card, or stored value card, received. For example, in one embodiment, information for gift cards for a specific merchants may be received. In another embodiment, information for pre-paid network gift cards (e.g., Visa gift cards, American Express gift cards, etc.) may be received. In another embodiment, information for gift certificates for specific merchants may be received. For example, if a paper gift certificate is used, the information may be manually entered, scanned, entered by taking a photograph of the gift certificate, etc. In another embodiment, the issuing merchant may link a paper gift certificate to an account upon surrender of the paper gift certificate.

Next, in step 210, the user may identify at least one account or identifier with which to link the gift card. In general, the user may link the gift cards to any account, device, or identifier that may be used to conduct a transaction. For example, the user may identify one or more credit card accounts, checking accounts, debit card accounts, private label accounts, etc. with which to link the gift cards.

In one embodiment, the account may be an online account, such as an on-line gaming account. Examples include the Sony PlayStation Network, Xbox Live, etc.

In one embodiment, the user may link the gift card to more than one account. For example, if a user has three credit cards and one debit card, the user may link the gift cards to all four accounts.

Similarly, the user may also link the gift cards to an account alias that may be used in place of an account number, such as a phone number, email address, etc. The user may also link the gift cards to a token, transponder, etc. In another embodiment, the act of linking the gift card to the account may also link the gift card to the account alias.

In one embodiment, the gift cards may be linked before a transaction, or may be registered after a transaction. In one embodiment, the user may be required to link the gift card within a certain period following the transaction. For example, the user may be required to link the card by the end of the day of the transaction, by the end of the billing cycle, within a set time (e.g., within two business days of the transaction), etc.

In one embodiment, the gift cards may be registered or linked to a biometric for the user. For example, the user may provide a biometric (e.g., fingerprint, retina scan, voice, image (e.g., face), behavior, etc. that may be used to access the gift card account and/or authenticate the user.

In step 215, the user may enter preferences for using the linked gift card. For example, the user may enter preferences as to whether to be asked to use the credit card balance before it is used, what to do when the linked account has certain promotions, whether to receive merchant updates, whether to receive balance alerts, reductions based on gift card non-use, warnings before a gift card expires, etc.

In one embodiment, the user may specify different behaviors for in-person and on-line transactions.

For example, if the gift card is linked to a credit card, and the credit card has a 5% savings if the credit card is used, the user may wish to save the gift card value for the next, non-promotional purchase. The user may request to be asked whether to use the gift card, or may default to non-use of the gift card. In one embodiment, the user may be presented with the savings associated with using the linked account instead of the gift card.

Any suitable preference may be provided as necessary and/or desired.

Figure 3:
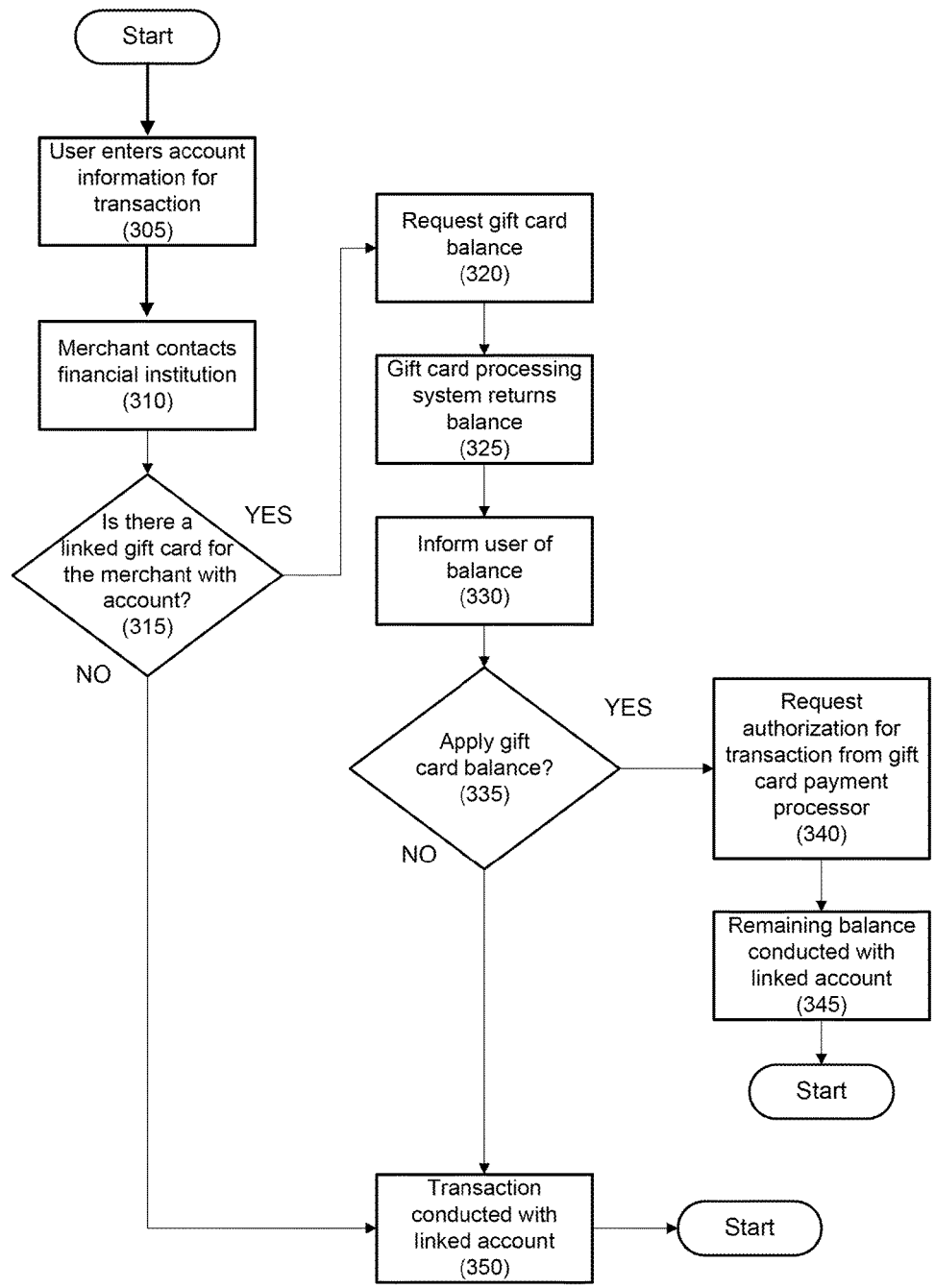
FIG. 3 depicts a method for using a linked gift card according to one embodiment.

Referring to FIG. 3, a method for using a linked gift card according to one embodiment is provided.

In order to conduct a transaction, in step 305, the user may enter account information to pay for a transaction with a merchant. In one embodiment, the user may swipe/dip a credit, debit, or private label card; enter a card number for an online transaction; enter an alias; tap a card or RFID token, etc.

In step 310, the merchant may contact the financial institution for the account with the transaction information. In one embodiment, this may be the financial instrument that issued the credit or debit card, the financial institution that hosts the private label account, the bank that holds the checking account, etc.

In step 315, the financial institution's payment processing system may determine whether the user has a linked gift card with the merchant. In one embodiment, the financial institution's payment processing system may check registration data to determine if the user has a linked gift card with the merchant. In one embodiment, the financial institution's payment processing system may retrieve the user's preferences.

If the user does have a linked gift card, in step 320, the financial institution's payment processing system may contact the merchant's gift card processing system to make a balance inquiry. In step 325, the merchant's gift card processing system may then return a gift card balance to the payment processing system.

In step 330, the financial institution's payment processing system may inform the user, through the point of sale device, mobile application, website, SMS, etc. of the balance, and may ask the user whether or not to use the gift card balance. This may be based on the user's preferences. If, in one embodiment, the user has set a preference to use the gift card balance automatically, the user may not be asked.

In one embodiment, the user may be alerted of any potential savings associated with using the presented account instead of using the gift card balance. For example, if the user presents a credit card that has a 5% rebate promotion, the user may be informed of this promotion, the amount of savings, etc. and requested to confirm the use of the gift card or the presented account.

In step 335, if the user wants to apply the gift card balance, or if the user has set a preference to default to the gift card, in step 340, the financial institutions' payment processing system may request authorization from the gift card processing system for the transaction.

In step 345, any balance that remains may be charged to the account that was initially presented for payment.

In step 350, if there is not a linked gift card for the merchant, or if the user does not want to use the gift card balance to pay for the transaction, the transaction may be conducted with the linked account.

In one embodiment, the application of the gift card balance may take place substantially in real time at the time of the transaction.

Figure 4:
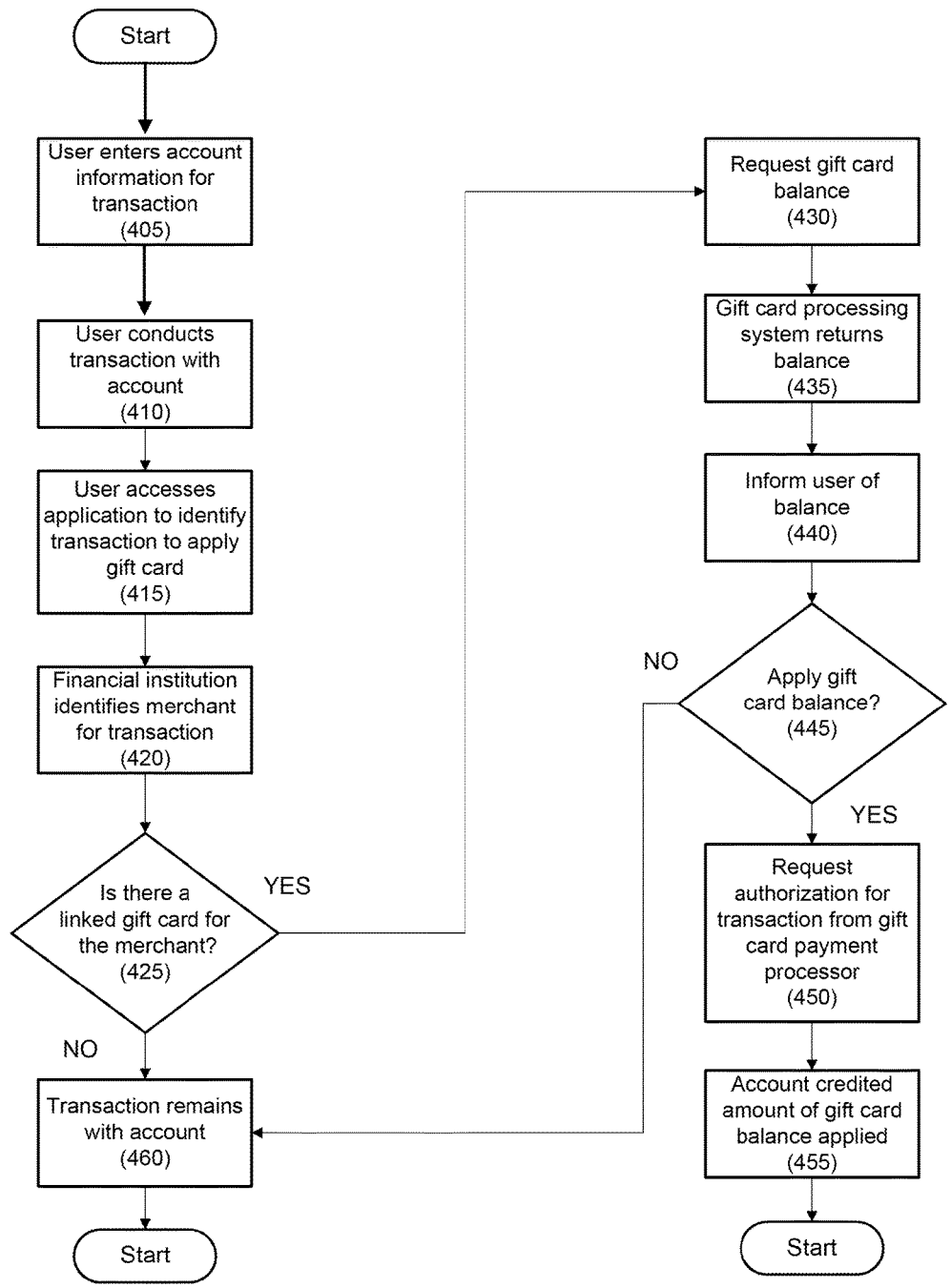
FIG. 4 depicts a method for gift card linking according to one embodiment.

In another embodiment, the application of the gift card balance may occur after the transaction has occurred. In addition, the payment processing system may process the gift card transactions individually, in batches, etc. Referring to FIG. 4, an exemplary process flow for gift card linking according to another embodiment is provided.

In step 405, the user may enter account information to pay for a transaction with a merchant. This may be similar to step 305, above.

In step 410, the user may conduct the transaction with the identified account.

In step 415, the user may access an application to identify a transaction to apply a gift card balance to. In one embodiment, the application may be a mobile application, a software program, a website, etc. In one embodiment, the application may provide access to the transactions conducted with the account.

In step 420, the financial institution may identify a merchant associated with the identified transaction.

In step 425, the financial institution's payment processing system may determine whether the user has a linked gift card with the merchant. This may be similar to step 315, above. If the user does, in step 430, the financial institution's payment processing system may contact the merchant's gift card processing system to make a balance inquiry. In step 435, the merchant's gift card processing system may then return a gift card balance to the payment processing system.

If the user does not have a linked gift card with the merchant, in step 460, the transaction remains with the account.

In step 440, the financial institution's payment processing system may inform the user, through the application, website, SMS, etc. of the balance, and may ask the user whether or not to use the gift card balance. This may be based on the user's preferences.

In step 445, if the user wants to apply the gift card balance, in step 450, the financial institutions' payment processing system may request authorization from the gift card processing system for the transaction.

If the user does not have a linked gift card with the merchant, in step 460, the transaction remains with the account.

In step 455, the user's account is credited the amount of the gift card balance that was used. Any remaining balance will remain on the account.

Figure 5:
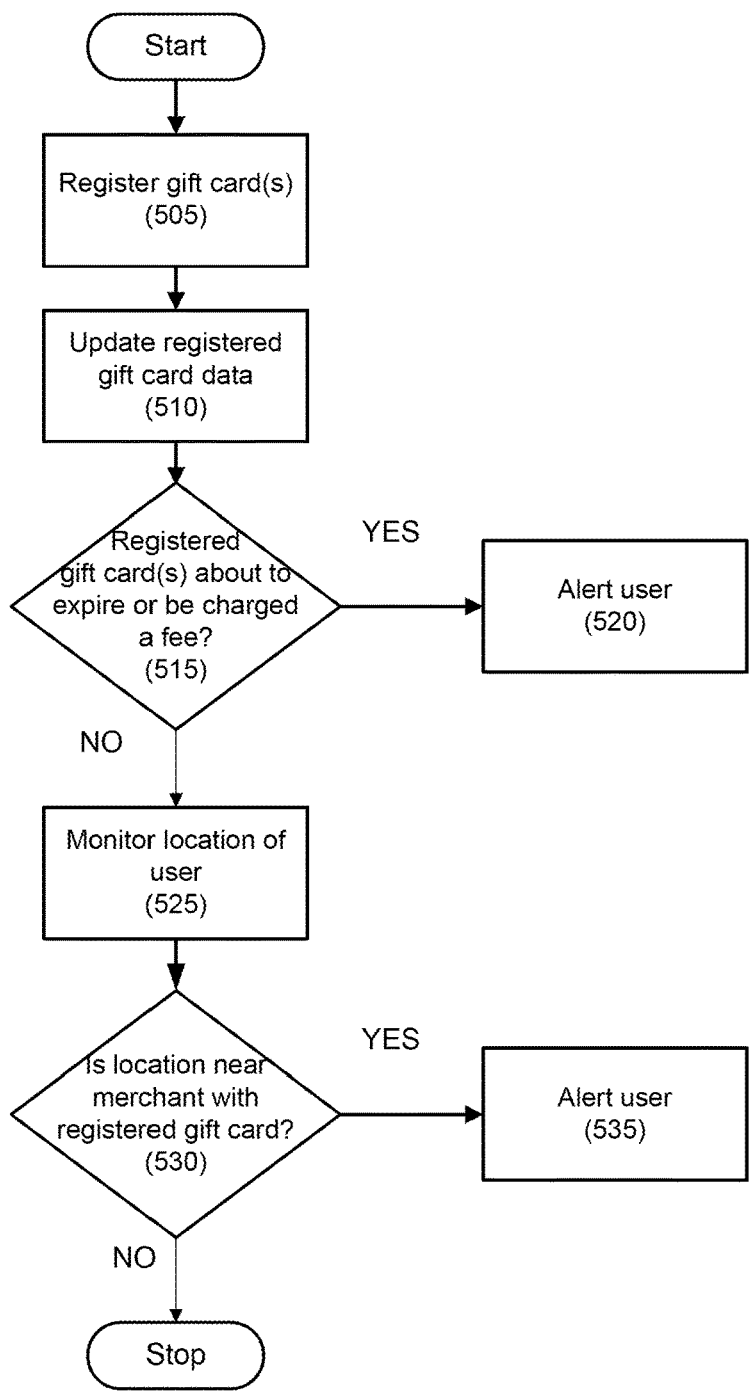
FIG. 5 depicts a method of tracking gift card balances according to one embodiment.

Referring to FIG. 5, a method of tracking gift card balances according to one embodiment is provided. In step 505, the user may register one or more gift cards, gift certificates, etc. as discussed above.

In step 510, the system may periodically update the data for the registered gift card(s). In one embodiment, this may be conducted on a daily basis, hourly basis, or any suitable basis. In one embodiment, the user may manually request that the data be updated.

In one embodiment, to update the gift card data, the system may contact the merchant's gift card processing system to retrieve, for example, the current gift card balance, expiration date, upcoming maintenance fees, etc.

In step 515, the system determine if there are any registered gift cards that are within a predetermined period of expiring, being assessed a maintenance fee, etc.. The predetermined period for expiring may be set, for example, as a user preference.

If there are, in step 520, the system may alert the user. In one embodiment, the alert may be provided by SMS, email, push notification on a mobile device, etc. In one embodiment, a mobile application may provide the notification.

In step 525, the system may monitor a location of a mobile electronic device that may be registered to the user. For example, the GPS location of the user's registered mobile electronic device may be periodically received by the system. In another embodiment, the location of the user may be determined from social media, text analytics of messages sent and/or received by the user, etc. In still another embodiment, the location of the user may be determined from the user's calendar entries and associated locations.

In step 530, the system may determine whether the monitored location is within a predetermined distance of a merchant with which the user has a registered gift card. In one embodiment, the predetermined distance may be set by the user as a preference. In another embodiment, the predetermined distance may be within the same shopping center/facility as the monitored location.

If the monitored location is within a predetermined distance of the merchant, in step 535, the system may alert the user. In one embodiment, the alert may be provided by SMS, email, push notification on a mobile device, etc. In one embodiment, a mobile application may provide the notification.

In one embodiment, the user may set preferences to only be alerted with a merchant with a registered gift card has a sale, promotion, etc. Any suitable user preferences may be used as necessary and/or desired.

The disclosures of U.S. patent application Ser. No. 13/540,784; U.S. patent application Ser. No. 12/907,109; U.S. patent application Ser. No. 12/907,115; U.S. patent application Ser. No. 13/616,625; and U.S. patent application Ser. No. 13/027,624 are hereby incorporated by reference in their entireties.

In one embodiment, the user may trade or exchange registered gift cards. For example, in one embodiment, a financial institution may redeem registered gift cards for statement credits, for gift cards with other merchants, etc. In one embodiment, the credit card issuer may charge the customer a fee, which may result in the reduction in the value of the gift card. For example a user may be charged a 10% fee to redeem a gift card for a statement credit, to exchange a gift card, etc.

In one embodiment, the user may be required to destroy the plastic gift card as part of the redemption/exchange. In one embodiment, the user may provide proof of such destruction, such as a picture of the plastic gift card cut in half.

In another embodiment, the user may be required to provide the plastic gift card before the statement credit or exchange may be completed. For example, the user may be required to mail the gift card, drop the gift card to a branch location, etc.

In still another embodiment, if the gift card is surrendered to a financial institution, the merchant may zero the gift card and issue a gift card for the same amount (or an amount minus a fee) to the financial institution.

In another embodiment, the user may agree not to use the gift card number in the future, not to transfer the gift card to another person, etc. The user may agree to certain penalties associated with any unauthorized use that can be linked to the seller, etc.

Figure 6:
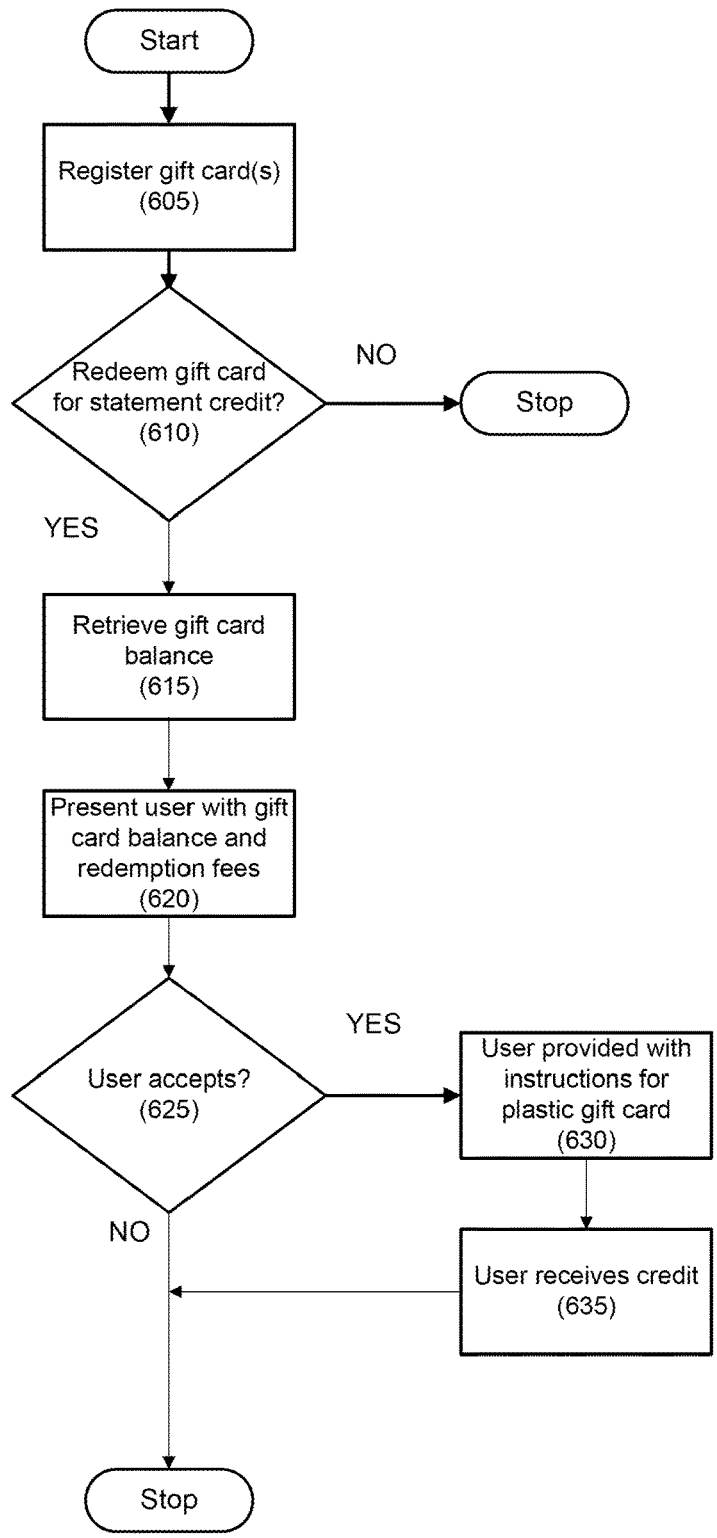
FIG. 6 depicts a method for redeeming or exchanging registered gift cards according to one embodiment.

Referring to FIG. 6, a method for redeeming or exchanging registered gift cards is provided. In step 605, the user may register a gift card as discussed above. In another embodiment, the user may not be required to register the gift card, but may instead provide gift card information such as the merchant/issuer, amount, expiration, etc.

In step 610, the user may select to redeem the gift card for a statement credit or exchange the gift card for one with a different merchant. If the user selects this option, in step 615, the system may contact the gift card merchant's payment processing system to determine the balance remaining on the gift card. In step 620, the user may be presented with the gift card amount, and any associated fees for redeeming the gift card.

If the user is exchanging the gift card for one with a different merchant, the user may select a gift card for the exchange.

If, in step 625, the user accepts the balance and fee, in step 630, the user may be instructed to destroy the plastic gift card, return the plastic gift card, or otherwise indicate that the user will no longer attempt to use the plastic gift card.

Once the plastic gift card is returned, destroyed, or otherwise agreed not to be used, in step 635, the user may receive a statement balance or the exchange.

In one embodiment, as part of its agreements with merchants to provide credit card services, a credit card issue may apply the value of cards that it acquires through redemption, exchange, etc.

The credit card issuer may apply the value of the cards that it has acquired in settlement with the merchant for other credit card transactions, private label transactions, or any other relationship that may exist between the merchant and the credit card issuer. An example of combined reconciliation is disclosed in U.S. Pat. No. 7,953,653, the disclosure of which is hereby incorporated, by reference, in its entirety.

In one embodiment, the credit card issuer may enter into direct relationships with the merchants. In one embodiment, the merchant may provide the credit card issuer access to its gift card processing system, which may be a closed loop system.

In one embodiment, the credit card issuer may permit a cardholder to register gift cards for statement credits, to exchange gift cards for a first merchant for a gift card with a second merchant, etc. In one embodiment, the credit card issuer may charge the customer a fee, which may result in the reduction in the value of the gift card. The credit card issuer may apply the value of the cards that it has acquired in settlement with the merchant for other credit card transactions, private label transactions, or any other relationship that may exist between the merchant and the credit card issuer. An example of combined reconciliation is disclosed in U.S. Pat. No. 7,953,653, the disclosure of which is hereby incorporated, by reference, in its entirety.

Figure 7:
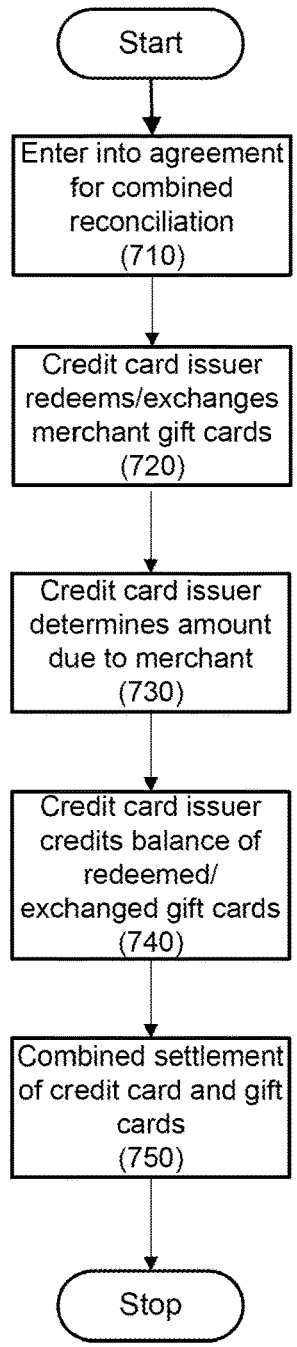
FIG. 7 depicts a method for combined reconciliation according to one embodiment.

Referring to FIG. 7, an example of combined reconciliation according to one embodiment is provided. In step 710, a credit card issuer and a merchant may enter into an agreement for combined reconciliation of credit card changes and gift cards. In one embodiment, the agreement may include terms and conditions for fees, discounts, incentives, etc.

In step 720, the credit card issuer may redeem merchant gift cards from users for statement credits, in exchange for gift cards for other merchants, etc.

In step 730, periodically or as otherwise desired, the credit card issuer may determine an amount that is due to be paid to the merchant for purchases using its credit cards, and an amount of gift cards that it has received through redemptions and/or exchanges.

In step 740, the credit card issuer may credit itself the amount of the collective balance of the redeemed/exchanged gift cards. In one embodiment, the amount of the credit may be adjusted based on the agreed-upon terms and conditions. In one embodiment, the gift card balance may be reduced. In another embodiment, the gift card balance may be increased.

In step 750, the credit card issuer may settle the credit card balance with the merchant, and may provide a report of the gift card balance.

The following disclosures are related to the present invention and are hereby incorporated, by reference, in their entireties: U.S. Pat. No. 6,985,873 entitled "System And Method For Administrating A Brokerage Rebate Card Program"; U.S. patent application Ser. No. 10/284,394, entitled "System And Method For Establishing Or Modifying An Account With User Selectable Terms"; U.S. patent application Ser. No. 10/683,294, entitled "System And Method For Granting Promotional Rewards To Credit Account Holders"; U.S. patent application Ser. No. 11/202,325, entitled "Rewards Program System And Method"; U.S. patent application Ser. No. 11/221,706, entitled "Terminal For Implementing Simultaneous Reward Programs"; U.S. patent application Ser. No. 11/447,031, entitled "System And Method For Presenting Loyalty Offers at a Point-of-Sale"; U.S. patent application Ser. No. 11/634,159, entitled "System And Method For Offering Rewards Programs"; U.S. patent application Ser. No. 11/686,203, entitled "System And Method For Dynamically Identifying, Prioritizing And Offering Reward Categories"; U.S. patent application Ser. No. 11/557,758, entitled "System And Method For Establishing Or Modifying An Account With User Selectable Terms"; U.S. patent application Ser. No. 11/488,783, entitled "System And Method For Granting Promotional Rewards To Credit Account Holders"; U.S. patent application Ser. No. 11/749,213, entitled "System And Method For Combined Reconciliation Of Co-Branded Card Promotion And Settlement Of Private Label Card Accounts"; U.S. patent application Ser. No. 12/017,938, entitled "System And Method For Offering Products And Services Via Reward Programs"; U.S. patent application Ser. No. 12/043,760, entitled "System And Method For Granting Promotional Rewards To Financial Account Holders"; U.S. patent application Ser. No. 12/350,015, entitled "System And Method For Processing Transactions Using A Multi-Account Transaction Device"; U.S. patent application Ser. No. 10/665,250, entitled "System and Method For Processing Transactions"; U.S. patent application Ser. No. 11/185,847, entitled "Personalized Bank Teller Machine"; U.S. patent application Ser. No. 12/907,109, entitled "System and Method for Earning and Redeeming Points", U.S. patent application Ser. No. 13/803,298, entitled "System and Method for Instant Credit Using a Mobile Device", and U.S. patent application Ser. No. 11/968,036, entitled "System and Method for Applying Benefits to Transactions."

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

We claim:

1. A method for gift card exchange, comprising:
   in an information processing apparatus including at least a memory, a communication interface, and at least one computer processor:
   receiving, from a mobile electronic device associated with a customer, an identification of a first stored value instrument for a first merchant;
   receiving, from the mobile electronic device associated with customer, an exchange request to exchange the stored value instrument for second stored value instrument for a second merchant;
   retrieving a balance for the first stored value instrument from a stored value instrument processor for the first merchant;
   determining an exchange amount for the exchange based on the balance for the first stored value instrument;

communicating the balance for the first stored value instrument and the exchange amount to the mobile electronic device associated with the customer;

receiving, from the mobile electronic device associated with the customer, approval to exchange the first stored value instrument;

exchanging the first stored value instrument for the exchange amount; and issuing, to the mobile electronic device associated with the customer, the second stored value instrument for the second merchant.

2. The method of claim 1, wherein the exchange amount is less than the balance.

3. The method of claim 1, further comprising:
communicating, to the mobile electronic device, an agreement to not use the first stored value instrument; and
receiving, from the mobile electronic device, confirmation of the agreement.

4. The method of claim 3, wherein the confirmation of the agreement comprises an image of the first stored value card in an unusable state.

5. The method of claim 1, further comprising:
receiving an indication that the first stored value instrument has been surrendered.

6. The method of claim 1, wherein the step of exchanging the first stored value instrument for the exchange amount comprises communicating the second stored value instrument having a value equal to the exchange amount to the mobile electronic device.

7. The method of claim 1, wherein the request for approval to exchange the first stored value instrument for the exchange amount comprises an identification of a plurality of stored value instrument for merchants other than the first merchant and having a balance equal to the exchange amount, and the approval to exchange the first stored value instrument further comprises a selection of one of the plurality of stored value instruments.

8. The method of claim 1, wherein determining the exchange amount for the exchange based on the balance for the first stored value instrument comprises assessing a fee for the exchange.

9. The method of claim 8, wherein the fee is equal to the difference between the balance for the first stored value instrument and the exchange amount.

10. The method of claim 1, further comprising:
requesting a replacement value instrument from the stored value instrument processor for the first merchant for the first stored value instrument.

11. The method of claim 1, further comprising:
applying the balance of the first stored value instrument in a transaction settlement with the first merchant.

\* \* \* \* \*